(12) United States Patent
Jung et al.

(10) Patent No.: US 8,984,471 B2
(45) Date of Patent: Mar. 17, 2015

(54) ELECTRONIC APPARATUS, METHOD OF OPTIMIZING DE-COUPLING CAPACITOR AND COMPUTER-READABLE RECORDING MEDIUM

(71) Applicant: Samsung Electronics Co., Ltd, Suwon-si, Gyeonggi-do (KR)

(72) Inventors: Dong-yeol Jung, Yongin-si (KR); Sang-ho Lee, Seoul (KR); Jeong-nam Cheon, Seoul (KR); Seung-hun Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/800,276

(22) Filed: Mar. 13, 2013

(65) Prior Publication Data

US 2014/0068539 A1    Mar. 6, 2014

(30) Foreign Application Priority Data

Sep. 3, 2012    (KR) .................. 10-2012-0097219

(51) Int. Cl.
*G06F 17/50*    (2006.01)
*H01L 25/16*    (2006.01)
*H01L 25/18*    (2006.01)
(Continued)

(52) U.S. Cl.
CPC ........ *G06F 17/5081* (2013.01); *G06F 17/5063* (2013.01); *H01L 25/16* (2013.01); *H01L 25/18* (2013.01); *H05K 1/0231* (2013.01); *H05K 1/181* (2013.01); *G06F 17/5036* (2013.01); *H05K 1/114* (2013.01); *H01L 2924/19105* (2013.01); *H01L 2924/19106* (2013.01); *H05K 2201/10053* (2013.01); *H05K 2201/10159* (2013.01); *H05K 2201/10545* (2013.01); *G06F 2217/82* (2013.01); *H01L 2924/0002* (2013.01)
USPC ............ 716/137; 716/115; 716/122; 716/135

(58) Field of Classification Search
CPC ............ G06F 17/5036; G06F 17/5063; G06F 17/5081; H01L 25/16; H01L 25/18; H01L 2924/19106; H01L 2924/0002; H01L 2924/00; H01K 1/181; H01K 1/0231; H05K 2201/10053; H05K 2201/10159; H05K 2201/10545; H05K 1/114
USPC ......................... 716/115.119, 122, 137, 135
See application file for complete search history.

(56) References Cited

U.S. PATENT DOCUMENTS 5,982,633 A    11/1999    Jeansonne
7,983,880 B1    7/2011    Fender et al.
(Continued)

FOREIGN PATENT DOCUMENTS

WO    2004-095537    11/2004

OTHER PUBLICATIONS

European Search Report dated Aug. 19, 2013 issued in EP Application No. 13164606.9.
(Continued)

*Primary Examiner* — Vuthe Siek
(74) *Attorney, Agent, or Firm* — Staas & Halsey LLP

(57) ABSTRACT

An electronic apparatus may include a circuit board, a processor disposed on an upper surface of the circuit board, and a memory disposed on a lower surface of the circuit board, such that the lower surface of the circuit board where the processor is arranged overlaps an area corresponding to where the memory is disposed.

7 Claims, 16 Drawing Sheets

(51) Int. Cl.
*H05K 1/02* (2006.01)
*H05K 1/18* (2006.01)
*H05K 1/11* (2006.01)

(56) References Cited

U.S. PATENT DOCUMENTS

| | | | |
|---|---|---|---|
| 8,086,435 | B1 | 12/2011 | Alexander |
| 8,214,781 | B1 | 7/2012 | Liu et al. |
| 2003/0148578 | A1* | 8/2003 | Ku et al. ................ 438/239 |
| 2006/0231912 | A1 | 10/2006 | Tanaka et al. |
| 2009/0032921 | A1 | 2/2009 | Koga |
| 2009/0234602 | A1 | 9/2009 | Kashiwakura |
| 2010/0026408 | A1 | 2/2010 | Shau |
| 2011/0031610 | A1* | 2/2011 | Yamazaki et al. ............ 257/693 |
| 2012/0049947 | A1 | 3/2012 | Arsovski et al. |
| 2012/0136598 | A1 | 5/2012 | Dmitriev-Zdorov |

OTHER PUBLICATIONS

Extended European Search Report dated Nov. 4, 2014 from European Patent Application No. 13164606.9.

* cited by examiner

FIG. 7

$$\boxed{\text{Noise sum}} = \text{Cumulative Sum} \left| \boxed{\text{Current Profile}} \times \boxed{\text{Impedance of PDN}} \right|$$

ELECTRONIC APPARATUS, METHOD OF OPTIMIZING DE-COUPLING CAPACITOR AND COMPUTER-READABLE RECORDING MEDIUM

CROSS-REFERENCE TO RELATED APPLICATIONS

This application claims priority under 35 U.S.C. §119 from Korean Patent Application No. 10-2012-0097219, filed on Sep. 3, 2012, in the Korean Intellectual Property Office, the disclosure of which is incorporated herein by reference in its entirety.

BACKGROUND

1. Field

The present general inventive concept relates to an electronic apparatus, a method of optimizing de-coupling capacitors and computer readable recording medium thereof, and more specifically, to a memory apparatus having a small area and an electronic apparatus thereof.

2. Description of the Related Art

The latest electronic products include a memory to temporarily store data for processing thereof, and the memory provides high speed signal inputting and outputting via a microprocessor unit (MPU).

During the processing of the high speed inputting and outputting of the signals, signal integrity should be secured, and various design methods are provided to achieve the same. However, a power supply component such as a DC-DC converter, for example, periodically generates noise due to switching, affecting a power supply integrity of the integrated circuit (IC), and may be coupled to other signals to affect the signal integrity.

Thus, conventional printed circuit boards utilize de-coupling capacitors to suppress the power supply noise and to stabilize the power supply of various electronic products. The de-coupling capacitors play a role of a being stable suppliers of electric power to the MPU and the memory by utilizing the stored electric energy.

However, no specific designs exist that connect the de-coupling capacitors to both the memory and the MPU.

Further, by referring to FIGS. 15 and 16, the signal noise between a memory 30 and a MPU 20 particularly give severe influence as they are positioned at a long-separated distance from each other on a printed circuit board (PCB) 10. Further, a number of de-coupling capacitors 41 and 42 according to the conventional printed circuit board increases, since the de-coupling capacitors 41 of the memory 30 are arranged on a lower surface of the memory 30 and additional de-coupling capacitors 42 of the MPU 20 are arranged on a lower surface of the MPU 20.

SUMMARY

The present general inventive concept provides electronic apparatuses which have a small area and share de-coupling capacitors.

The present general inventive concept also provides an electronic apparatus optimizing the number of de-coupling capacitors, a method of optimizing the de-coupling capacitors and a computer readable recording medium thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an electronic apparatus including a circuit board, a processor disposed on an upper surface of the circuit board, and a memory disposed on a lower surface of the circuit board, such that the lower surface of the circuit board on which the processor is disposed may overlap an area corresponding to where the memory is disposed.

The processor may include a plurality of first terminals to transmit and receive signals to and from the memory, the memory may include a plurality of second terminals to transmit and receive signals to and from the processor, and at least one of the plurality of first terminals may connect to at least one of the plurality of second terminals through a via hole of the circuit board.

The plurality of first terminals may be arranged on an upper surface of the circuit board, and the plurality of second terminals may be arranged on a lower surface of the circuit board to correspond to the plurality of first terminals.

The signals transmitted and received through the plurality of first terminals and the plurality of second terminals may include at least one of a data signal, a control signal and a clock signal.

The electronic apparatus may additionally include a de-coupling capacitor commonly connected to a power supply of the processor and a power supply of the memory.

The electronic apparatus may additionally include a first switch arranged between the power supply of the processor and the de-coupling capacitor, and a second switch arranged between the power supply of the processor and the de-coupling capacitors. The controller may shunt the first switch and open the second switch during memory writing operation, and may open the first switch and shunt the second switch during memory reading operation.

The processor may transmit a chip select signal to the memory, the first switch may shunt if the chip select signal is on and open if the chip select signal is off, and the second switch may open if the chip select signal is on and shunt if the chip select signal is off.

The de-coupling capacitor may include a plurality of de-coupling capacitors connected in parallel.

The foregoing and/or other features and utilities of the present general inventive concept may also be achieved by providing an electronic apparatus including a user interface to receive select input of a plurality of circuit devices, a storage to store electrical current information and a Scattering parameter (S-parameter) regarding input/output (I/O) ports of the plurality of circuit devices respectively, a calculator to calculate impedance per number of the de-coupling capacitors based on the stored S-parameters and to calculate an accumulated noise value per number of the de-coupling capacitors based on the calculated impedance and the electrical current information, and a controller to determine a number of the de-coupling capacitors based on the calculated accumulated noise values and to control the user interface to display the determined number of the de-coupling capacitors.

The storage may stores the electrical current information according to the IBIS model of the I/O ports of the plurality of circuit devices respectively.

The I/O ports may input and output at least one of a control signal, a data signal and an address signal of the circuit devices.

The S-parameter may be retrieved by utilizing the electromagnetic simulation of the power distribution network (PDN) regarding the I/O ports of the plurality of circuit devices respectively.

The calculator may calculate a noise value per frequency bandwidth based on the calculated impedance and the electrical current information, and calculate the accumulated noise values by accumulating the calculated noise values of the frequency bandwidths.

The plurality of circuit devices may include the memory and the processor.

The foregoing and/or other features and utilities of the present general inventive concept may also be achieved by providing a method of optimizing de-coupling capacitors may include retrieving electrical current information and a Scattering parameter (S-parameter) regarding the I/O ports of a plurality of selected circuit devices respectively, calculating impedance per number of the de-coupling capacitors based on the retrieved S-parameter and calculating an accumulated noise value per number of the de-coupling capacitors based on the calculated impedance and the retrieved electrical current information, and determining the number of the de-coupling capacitors based on the calculated accumulated noise values.

The retrieving may include retrieving the electrical current information according to the IBIS model regarding the I/O ports of the plurality of circuit devices respectively.

The I/O ports may input and output at least one of a control signal, a data signal and an address signal of the circuit devices.

The S-parameter may be retrieved by utilizing the electromagnetic simulation of the PDN regarding the I/O ports of the plurality of circuit devices respectively.

The calculating may include calculating noise value per frequency bandwidth based on the calculated impedance and the electrical current information, and calculating accumulated noise values by accumulating the calculated noise values of the frequency bandwidths.

The foregoing and/or other features and utilities of the present general inventive concept may also be achieved by providing a computer-readable recording medium having recorded thereon computer-readable codes to execute a method of optimizing de-coupling capacitors, including retrieving electrical current information and a Scattering parameter (S-parameter) regarding the I/O ports of a plurality of selected circuit devices respectively, calculating impedance per number of the de-coupling capacitors based on the retrieved S-parameter and calculating an accumulated noise value per number of the de-coupling capacitors based on the calculated impedance and the retrieved electrical current information, and determining the number of the de-coupling capacitors based on the calculated accumulated noise values.

The foregoing and/or other features and utilities of the present general inventive concept may also be achieved by providing an electronic apparatus, including a user interface to allow a user to select a plurality of circuit devices configured to be stacked with respect to each other, a controller to determine a number of de-coupling capacitors to be used within the electronic apparatus resulting from a calculation of accumulated noise values per number of de-coupling capacitors based on an impedance per number of de-coupling capacitors and electrical current information of the electronic apparatus, and at least one de-coupling capacitor commonly-connected to at least two of the plurality of circuit devices to reduce noise within the electronic apparatus based on the calculation of the accumulated noise values.

The controller may determine a least number of the de-coupling capacitors from among the calculated accumulated noise values that does not exceed 10% of a standard accumulated noise.

The plurality of circuit devices may include at least two of a circuit board, a memory, and a processor.

The electronic apparatus may further include a storage to store the electrical current information and a Scattering parameter (S-parameter) regarding input/output (I/O) ports of each of the plurality of circuit devices, and a calculator to calculate the impedance per number of the de-coupling capacitors based on the stored S-parameters and to perform the calculation of the accumulated noise value per number of the de-coupling capacitors based on the calculated impedance and the electrical current information.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 7 illustrates a formula of analyzing the power supply noises according to an exemplary embodiment of the present general inventive concept;

DETAILED DESCRIPTION OF THE PREFERRED EMBODIMENTS

Figure 1:
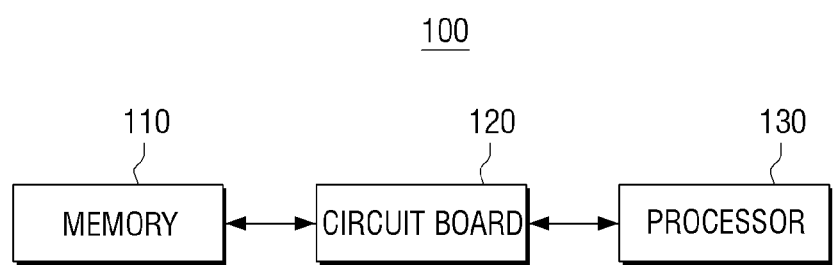
FIG. 1 illustrates an electronic apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 illustrates an electronic apparatus according to an exemplary embodiment of the present general inventive concept. The electronic apparatus may include a personal computer (PC) including a memory and a processor, a laptop computer, a smart phone, a portable music player (PMP), or a tablet PC, but is not limited thereto.

Referring to FIG. 1, an electronic apparatus 100 may include a memory 110, a circuit board 120, and a processor 130.

The memory 110 may be implemented as a recording apparatus to store program commands and information correspond to the processor 130 while the electronic apparatus 100 is operating. The memory 110 may be disposed on a lower surface of the circuit board 120. Specifically, the memory 110 may be positioned at the lower surface of the circuit board to correspond to and overlap at least a portion of the processor 130.

The memory 110 may include a plurality of second terminals to transmit and receive signals to and from the processor. The plurality of second terminals may be one-to-one mapped to correspond to the first terminals of the processor 130. The plurality of second terminals may be placed below the circuit board to correspond to the mapped first terminals.

The circuit board 120 may be a printed circuit board (PCB) connected to and arranged with the other components included within the electronic apparatus 100. The circuit board 120 may be a double-sided PCB having a conductive substrate. The circuit board 120 may further include another conductive substrate within at least one inner layer.

The processor 130 may include a microprocessor unit (MPU) to control the components within the electronic apparatus 100. Specifically, if a command directing to power on (i.e., perform a booting operation) the electronic apparatus 100 is input and if a power supply is provided, the processor 130 may copy an operating system (O/S) stored in a hard disk drive (HDD) or a solid state drive (SSD) (not illustrated) to the memory 110 according to a command stored in an inner ROM (not illustrated), implement the O/S, and power on the electronic apparatus 100. If the booting operation completes, the processor 130 may implement the service corresponding to a user command.

The processor 130 may be disposed on an upper surface of the circuit board 120. Specifically, the processor 130 may be positioned at the upper surface of the circuit board 120 to correspond to and overlap at least a portion of the memory 110.

The processor 130 may include a plurality of first terminals to transmit and receive the signals to the memory 110. The plurality of first terminals may be one-to-one mapped to correspond to the plurality of second terminals of the memory 110, and may be disposed on the upper surface of the circuit board 120 to correspond to the mapped second terminals.

According to an exemplary embodiment of the present general inventive concept, the processor 130, the circuit board 120 and the memory 110 may be arranged vertically with respect to each other. In other words, the processor 130, the circuit board 120 and the memory 110 may be respectively stacked on top of each other. Thus, because an input/output (I/O) signal length between the memory 110 and the processor 130 can be effectively shortened, the receiving the high speed signals is convenient and several problems such as signal integrity (SI), power integrity (PI), or electromagnetic interference (EMI) may be minimized. Further, because the memory 110, the circuit board 120 and the processor 130 may be arranged vertically with respect to each other as described above, a size of the circuit board 120 can be smaller.

Figure 6:
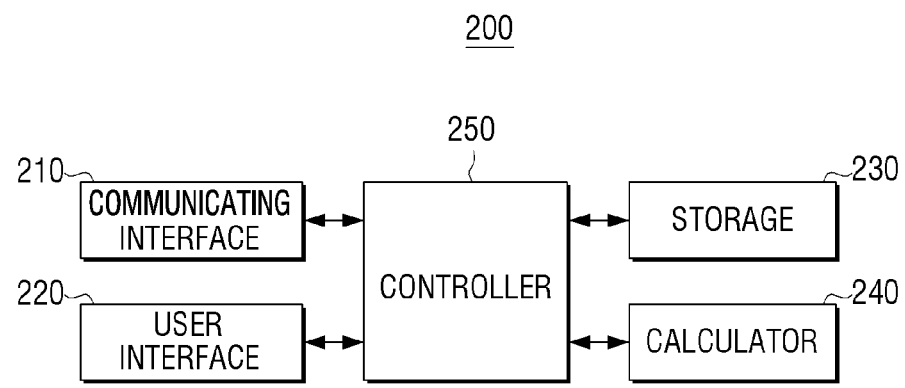
FIG. 6 is a diagram of an electronic apparatus according to an exemplary embodiment of the present general inventive concept.

FIG. 1 illustrates that the electronic apparatus 100 includes the memory 110, the circuit board 120, and the processor 130. However, the electronic apparatus 100 may further include additional components. For instance, the electronic apparatus 100 may further include de-coupling capacitors to maintain signal integrity within the electronic apparatus 100. By referring to FIGS. 2 and 3, other components included in the electronic apparatus 100 will be explained below. In addition, an electronic apparatus 200, according to an exemplary embodiment of the present general inventive concept as illustrated in FIG. 6, may include additional components not illustrated in the exemplary embodiment FIGS. 1 through 3. Nevertheless, the electronic apparatus 200 of FIG. 6 may include all the components within the electronic apparatus 100 of FIGS. 1 through 3.

Figure 2:
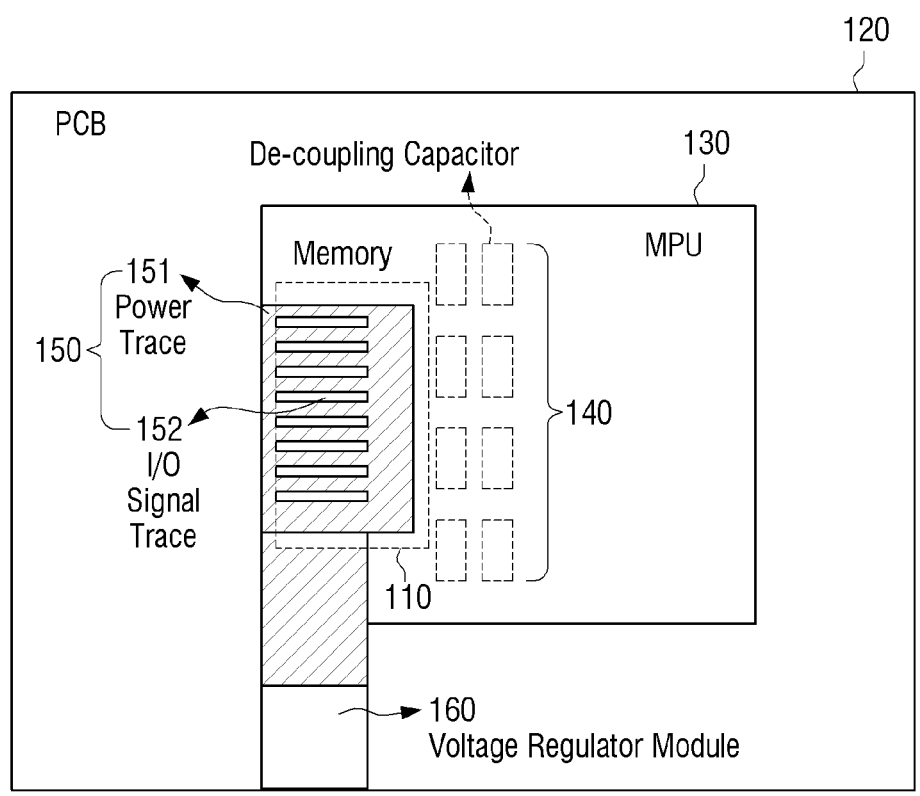
FIG. 2 illustrates a circuit board of an electronic apparatus according to an exemplary embodiment of the present general inventive concept.
Figure 3:
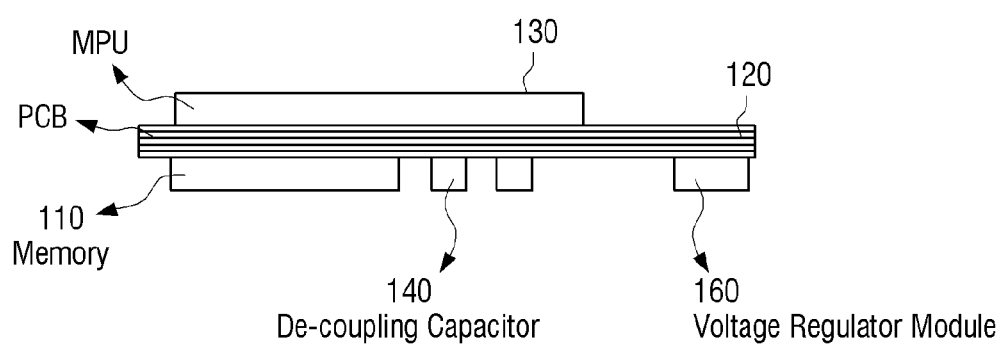
FIG. 3 is a side view of the circuit board of FIG. 2.

FIG. 2 illustrates the circuit board 120 of the electronic apparatus 100 according to an exemplary embodiment of the present general inventive concept. FIG. 3 is a side view of the circuit board 120 of FIG. 2.

Referring to FIGS. 2 and 3, the electronic apparatus 100 may include the memory 110, the circuit board 120, the processor 130, de-coupling capacitors 140, a wiring unit 150, and a power supply unit (e.g., a voltage regulator module) 160.

The memory 110 may be disposed on the lower surface of the circuit board 120. Specifically, the memory 110 may be positioned at the lower surface of the circuit board 120 to correspond to and overlap at least a portion of the processor 130.

The processor 130 may be disposed on the upper surface of the circuit board 120. Specifically, the processor 130 may be positioned at the upper surface of the circuit board 120 to correspond to and overlap at least a portion of the memory 110.

The de-coupling capacitors 140 may suppress the power supply noise, which may be generated from the power supply unit 160. Specifically, the de-coupling capacitors 140 may commonly-connect to the power supply of the processor 130 and the power supply of the memory 110, which are both arranged on the lower surface of the circuit board 120.

The de-coupling capacitors 140 according to an exemplary embodiment of the present general inventive concept may connect to the power supply of the processor 130 and the power supply of the memory 110 commonly, such that the processor 130 and the memory 110 may both share and utilize the de-coupling capacitors 140. Thus, a number of the de-coupling capacitors 140 may be reduced.

Specifically, the de-coupling capacitors 140 may be utilized by the processor 130 when the memory 110 is in a writing operation, and utilized by the memory 110 when the memory 110 is in reading operation.

The present exemplary embodiment illustrates that the de-coupling capacitors 140 are directly connected to the power supply of the memory 110 and the power supply 160 of the processor 130. However, the de-coupling capacitors 140 may also connect to the power supply of the memory 110 and the power supply 160 of the processor 130 through a switch 170, as illustrated in FIG. 5.

The de-coupling capacitors 140 may include a plurality of parallel-connected de-coupling capacitors. The number of the de-coupling capacitors 140 may be calculated by an optimizing method of the de-coupling capacitors 140, which is based on current consumption and impedance.

Figure 5:
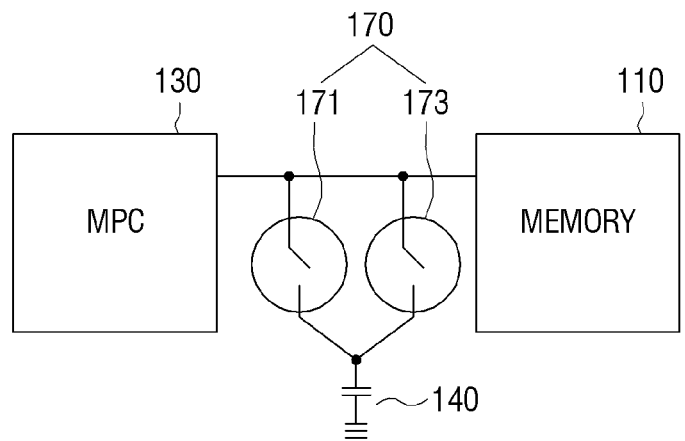
FIG. 5 illustrates the connecting relationship of de-coupling capacitors according to an exemplary embodiment of the present general inventive concept.

Referring to FIG. 5, the wiring unit 150 may provide the power supply 160 to the memory 110 and the processor 130 respectively, and connect the signals between the memory 110 and the processor 130 electronically. The wiring unit 150 may include a first wiring unit 151 and a second wiring unit 152.

The first wiring unit 151 may provide the power supply 160 to the memory 110 and the processor 130, respectively. Specifically, the first wiring unit 151 may provide power output from the power supply unit 160 to a power supply input port of the memory 110 and the power supply input port of the processor 130. The first wiring unit 151 may be disposed within an inner layer of the circuit board 120.

The second wiring unit 152 may transmit and receive the signals between the memory 110 and the processor 130. Specifically, the second wiring unit 152 may have a same number of wires as a number of the ports within the memory 110 and the processor 130, in order to transmit and receive signals therebetween. The second wiring unit 152 may electronically connect a plurality of second sockets of the memory 110 and a plurality of corresponding first sockets of the processor 130 by utilizing the plurality of wires. Furthermore, since the memory 110 and the processor 130 may be disposed on the upper and the lower surfaces of the circuit board 120, respectively, the second wiring unit 152 may include a via hole. Further designs will be explained below with reference to FIG. 4.

The power supply unit 160 may output the power to each component the electronic apparatus 100. Specifically, the power supply unit 160 may receive an external power from an AC power supply (or a DC power supply), convert the received AC power (or the DC power) to a DC power that can be utilized by each part of the electronic apparatus 100, and output the converted DC power to each component within the electronic apparatus 100, specifically, the memory 110 and the processor 130. The power of the power supply unit 160 may be output to the memory 110 and the processor 130 through the first wiring unit 151. The power supply unit 160 may be a DC-DC converter or a switched-mode power supply (SMPS).

According to an exemplary embodiment of the present general inventive concept, the memory 110, the circuit board 120, and the processor 130 may all be arranged vertically with respect to each other, and therefore a length of the wire between the memory 110 and the processor 130 can be shortened greatly. Thus, a transmission speed of the signals between the components increases, and several problems such as signal integrity (SI)/power integrity (PI)/electromagnetic interference (EMI) may be minimized. Further, because the memory 110, the circuit board 120, and the processor 130 may be arranged vertically as described above, the size of the circuit board 120 can be smaller. Further, the processor 130 and the memory 110 may share and utilize the de-coupling capacitors 140. Thus, the number of the de-coupling capacitors 140 may be reduced.

As illustrated in FIGS. 1 and 2, the processor 130 may be disposed on the upper surface of the circuit board 120, and the memory 110 may be disposed on the lower surface of the circuit board 120. However, the processor 130 may be disposed on the lower surface of the circuit board 120 and the memory 110 may be disposed on the upper surface of the circuit board 120.

Figure 4:
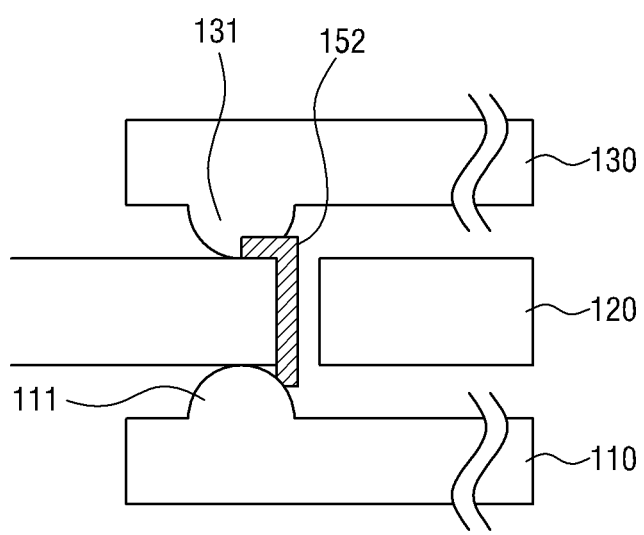
FIG. 4 illustrates the connecting relationship between a memory and a processor of FIG. 2.

FIG. 4 illustrates the relationship between the memory 110 and the processor 130 of FIG. 2.

Referring to FIG. 4, the memory 110 may include a plurality of second terminals 111, although FIG. 4 illustrates a single second terminal 111. The second terminals 111 may have a ball shape, but are not limited thereto.

The processor 130 may include a plurality of first terminals 131, although FIG. 4 illustrates a single first terminal 131 only. The first terminals 131 may have a ball shape, but are not limited thereto. The first terminals 131 and the second terminals 111 as illustrated in FIG. 4 are mapped such that they correspond to each other.

The second wiring unit 152 may be arranged to have the shortest distance between the first terminals 131 and the second terminals 111. Specifically, because the memory 110 and the processor 130 may be arranged vertically with respect to each other on the circuit board 120, the second wiring unit 152 may include a via-hole.

According to an exemplary embodiment of the present general inventive concept, the signals between the memory 110 and the processor 130 may be transmitted and received by utilizing the via-hole, and thus, the I/O signal length may be shortened greatly.

FIG. 5 illustrates the connecting relationship between the de-coupling capacitors 140 according to an exemplary embodiment of the present general inventive concept.

Referring to FIG. 5, the de-coupling capacitors 140 may commonly connect to the power supply 160 of the processor 130 and the power supply of the memory 110 through the switch 170.

The switch 170 may alternate the connecting state of the de-coupling capacitors 140 selectively. Specifically, the switch 170 may include a first switch 171 and a second switch 173.

The first switch 171 may be disposed between the power supply 160 of the processor 130 and the de-coupling capacitors 140. Specifically, the first switch 171 may shunt when the memory 110 is in a writing operation, and open when the memory 110 is in a reading operation. The operation of the first switch 171 may utilize the chip select signal from the signals transmitted from the processor 130 to the memory 110. The chip select signal may be output to the memory 110 when the memory 110 is in a reading operation in the processor 130. Thus, the first switch 171 may shunt when the chip select signal is on and open when the chip select signal is off.

The second switch 173 may be disposed between the power supply of the memory 110 and the de-coupling capacitors 140. Specifically, the second switch 173 may shunt when the memory 110 is in a reading operation and open when the memory 110 is in a writing operation. The operation of the second switch 171 may utilize the chip select signal from the signals transmitted from the processor 130 to the memory 110. Specifically, the second switch 171 may shunt when the chip select signal is off and open when the chip select signal is on.

If the memory 110 is in the reading operation, i.e., if the chip select signal is off, the first switch 171 may open, and the second switch 173 may shunt. The de-coupling capacitors 140 may be arranged to be close to the power supply 160 of the memory 110, while operating for the memory 110.

If the memory 110 is in the writing operation, i.e., if the chip select signal is on, the first switch 171 may shunt, and the second switch 173 may open. The de-coupling capacitors 140 may be arranged to be close to the power supply 160 of the processor 130, while operating for the processor 130.

The de-coupling capacitors 140 according to an exemplary embodiment of the present general inventive concept may commonly connect to the power supply of the processor 130 and the power supply of the memory 110. Thus, because the processor 130 and the memory 110 may share and utilize the de-coupling capacitors 140, the number of the de-coupling capacitors 140 may be reduced.

Meanwhile, a conventional method may utilize a power supply impedance evaluation to determine a number of de-coupling capacitors to be utilized when designing the de-coupling capacitors on a circuit board.

Specifically, in the conventional method, a Scattering parameter (S-parameter) of a Power Distribution Network (PDN) may be retrieved, a time constant and a number of the de-coupling capacitors may be changed, and the power supply impedance of the power supply may be compared. The S-parameter does not use open or short circuit conditions to characterize a linear electrical network, and instead, matched loads are used. As such, terminations associated with S-parameters are much easier to use at high signal frequencies than open-circuit and short-circuit terminations. After the above conventional method is performed, the number of the de-coupling capacitors may be determined.

However, power supply noise may occur in a form of electric current consumption multiplied by the impedance. Thus, it may not be efficient to determine the number of the de-coupling capacitors only with the impedance information. If the impedance is only utilized as in the conventional methods, the time constant and the number of the de-coupling capacitors may be over-arranged.

Thus, a system and a method of optimizing a number of de-coupling capacitors by considering both a current consumption and an impedance will be explained below by referring to FIGS. 6 through 14.

FIG. 6 illustrates an electronic apparatus according to an exemplary embodiment of the present general inventive concept.

Referring to FIG. 6, the electronic apparatus 200 according to an exemplary embodiment of the present general inventive concept may include a communicating interface 210, a user interface 220, a storage 230, a calculator 240, and a controller 250. The electronic apparatus 200 may include a PC, a laptop computer, a tablet PC, or the electronic apparatus 100 as illustrated in FIG. 1.

The communicating interface 210 may be arranged to connect the electronic apparatus 200 to an external device (not illustrated) by the Local Area Network (LAN), the Internet, or a wireless communication system such as Global System for Mobile Communications (GSM), Universal Mobile Telecommunications System (UMTS), long-term evolution (LTE), and Wireless Broadband (WiBRO).

The user interface 220 may include various function keys in which a user can set or select various functions provided by the electronic apparatus 200, and display various information provided from the electronic apparatus 200. The user interface 220 may be a device that simultaneously allows a user to perform input and output operations thereupon, such as a touch screen or a device combining a mouse and a monitor.

The user interface 220 may receive a selection of a plurality of circuit devices. Specifically, the user interface 220 may display various circuit devices on a screen to allow the user to view the various circuit devices that may be used to design the PCB circuit, and may receive the user's selection of the plurality of circuit devices. The circuit devices may be an I/O Buffer Information Specification (IBIS) model. The IBIS model is a digital I/O model to analyze correct signal integrity such as the PCB, a transmission line effect, a crosstalk, and a ringing caused by high frequency signals as a digital integrated circuit clock speed is heightened. The IBIS model provides the digital I/O pin voltage-current (VI) and the voltage-time (VT) in a table form, and describes features of packaging parasitic elements and electrostatic defending (ESD) circuit.

The user interface 220 may also receive selecting selection of a connecting relationship between the selected plurality of circuit devices, respectively. The selected circuit devices may be the memory 110 and the processor 130 of FIG. 1.

The storage 230 may store programs to operate the electronic apparatus 200. Specifically, the storage 230 may store the programs classifying various commands necessary to operate the electronic apparatus 200. The storage 230 may be a read-only memory (ROM), a hard disk drive (HDD), and a solid-state drive (SSD), but is not limited thereto. Furthermore, while not illustrated in FIG. 6, the storage 230 may include a storing device such as a random-access memory (RAM) to store the program commands and other information required by the controller 250.

The storage 230 may store electrical current information regarding the I/O ports of the plurality of circuit devices. The electrical current information may follow the IBIS model. The I/O ports may input and output at least one of a plurality of control signals, data signals, and address signals of the circuit device.

The storage 230 may store the S-parameter of the I/O ports of the plurality of circuit devices. The S-parameter may be retrieved regarding the I/O ports of the plurality of circuit devices by utilizing electromagnetic simulation. A method of retrieving the S-parameter will be described below by referring to FIG. 11.

The calculator 240 may calculate an impedance per number of de-coupling capacitors based on the S-parameter. The operation of the calculator 240 will be described below by referring to FIG. 11.

The calculator 240 may calculate an accumulated noise value per number of the de-coupling capacitors based on the calculated impedance and the electrical current information, specifically, a current profile. Specifically, the calculator 240 may calculate the noise values per frequency bandwidth based on the calculated impedance and the electrical current information, and calculate the accumulated noise values by accumulating the calculated noise values per frequency bandwidth. The detailed calculating of the accumulated noise will be described below by referring to FIG. 9. The electrical current information may be directly utilized to calculate the accumulated noise values. Additionally, the current profile may be retrieved and utilized from the electrical current information according to the IBIS model. The retrieving operation may be previously implemented and the result may be stored in the storage 230. Further, the retrieving operation may be implemented in the calculator 240. The detailed retrieving operation of the current profile will be described below by referring to FIGS. 8 and 9.

The controller 250 may control the components within the electronic apparatus 200. Specifically, if the command directing to turn on the electronic apparatus 200 is input and if a power supply is provided, the controller 250 may copy the O/S stored on the storage 230 according to the command stored in the interior ROM, run the O/S, and boot the electronic apparatus 200. If the booting of the electronic apparatus 200 completes, the controller 250 may implement the service corresponding to the user command through the user interface 220.

The controller 250 may determine the number of the de-coupling capacitors based on the calculated accumulated noise values. Specifically, the controller 250 may determine the least number of the de-coupling capacitors among the calculated accumulated noise values that does not exceed 10% of the standard accumulated noise. The "10% of the standard accumulated noise value" is merely one value in an exemplary embodiment of the present general inventive concept, and is not limited to herein. The standard accumulated noise value is the accumulated noise value wherein there are a sufficient number of de-coupling capacitors.

The controller 250 may control the user interface to display the determined de-coupling capacitors.

The electronic apparatus 200 may utilize the electrical current information retrieved by the IBIS modeling, analyze the power supply noise and determine the number of the de-coupling capacitors. Thus, the electronics power noise may be predicted more precisely, and the number of the de-coupling capacitors may be determined more efficiently.

According to FIG. 6, the calculator 240 and the controller 250 are illustrated to be separate components. However, functions of the calculator 240 and the controller 250 may be implemented by a single device.

FIG. 7 illustrates the power supply noise analyzing formula according to an exemplary embodiment of the present general inventive concept.

Referring to FIG. 7, the power supply noise may be generated by amplifying the electric current consumption and the impedance. Thus, according to an exemplary embodiment of the present general inventive concept, an absolute value of the noise may be calculated by amplifying the electrical current information provided from the memory interface modeling information utilizing the IBIS and the impedance of the arranged PDN. The accumulation sum of the calculated absolute values may be calculated using respective frequencies, and the accumulated noise values may be calculated. By changing the number of the de-coupling capacitors, a level of the accumulated noise values may be less than 10% of the standard accumulated noise values. The standard accumulated noise values may be based on a state in which a sufficient number of the de-coupling capacitors are arranged.

Figure 8:
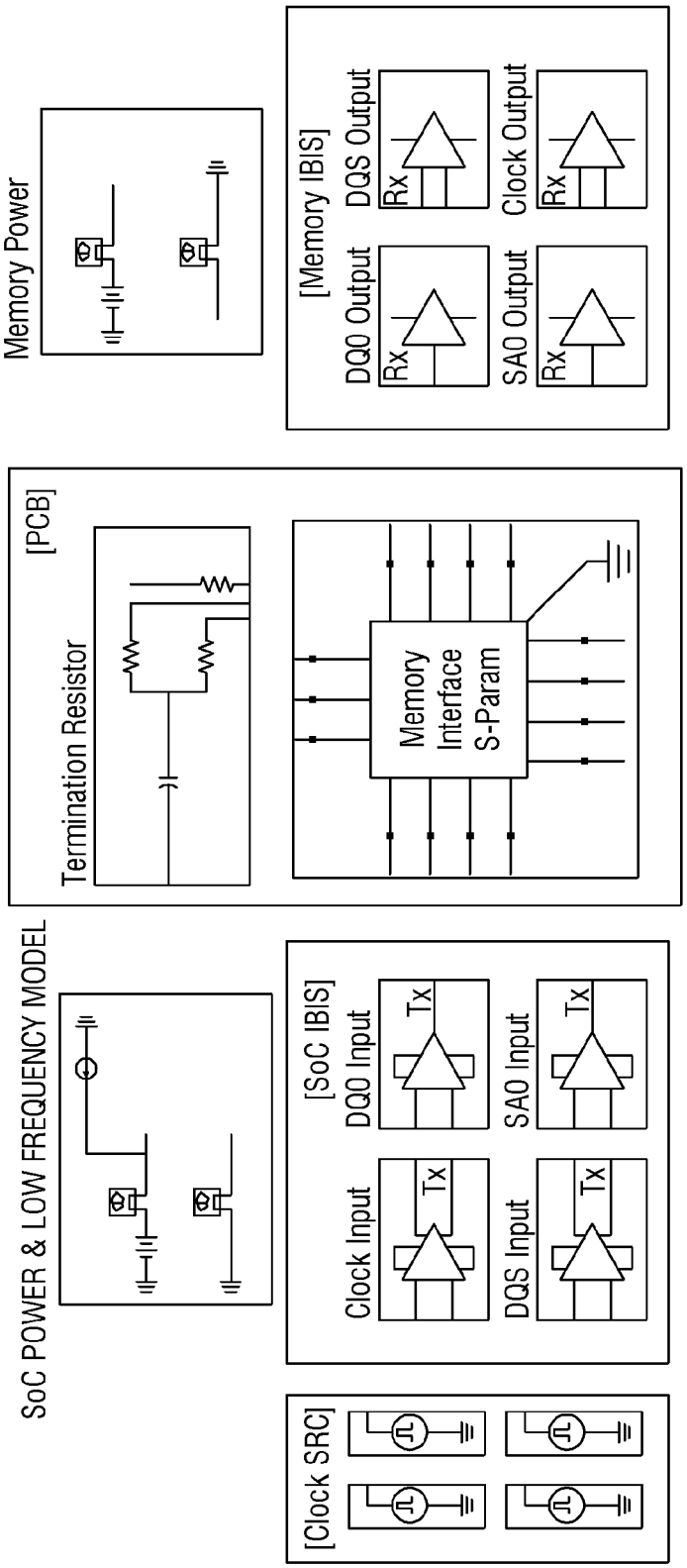
FIGS. 8 and 9 illustrate a component retrieving an electrical current profile of a memory interface utilizing the IBIS.
Figure 9:
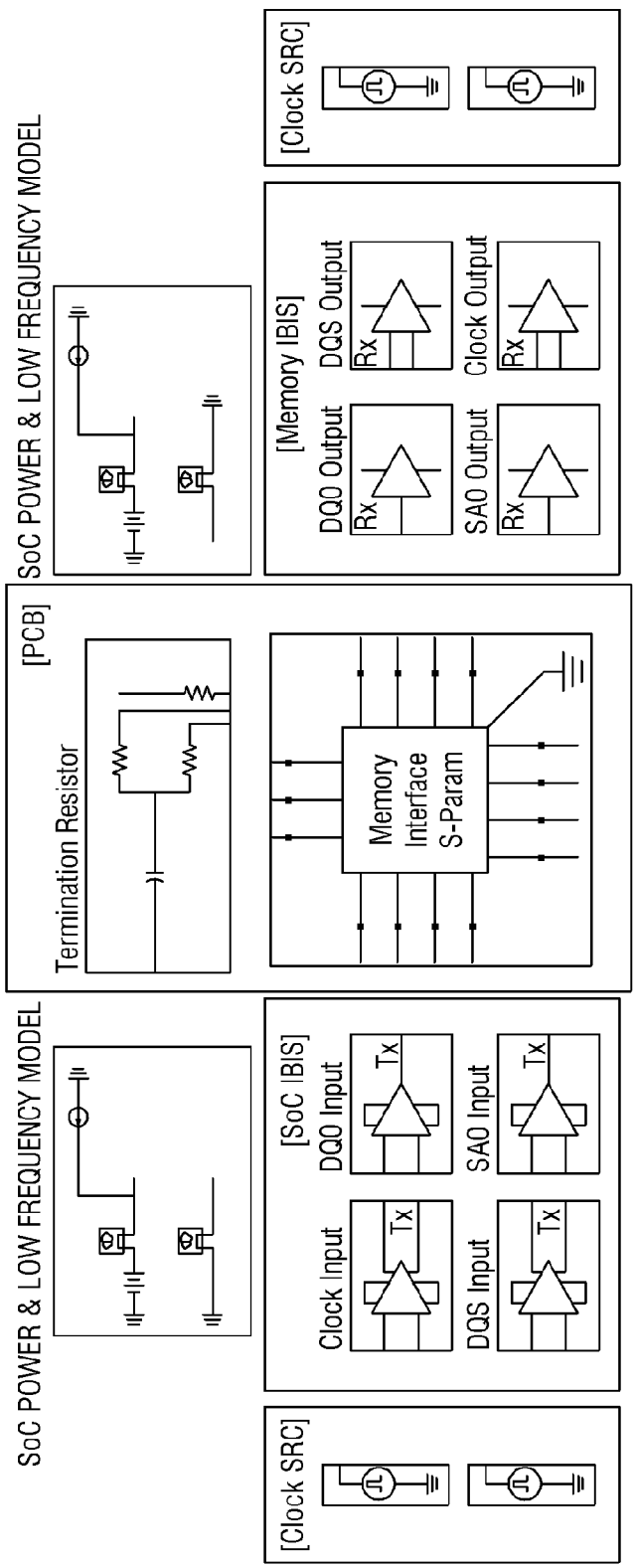

FIGS. 8 and 9 illustrate current profile retrieving components of a memory interface utilizing an IBIS. Specifically, FIG. 8 illustrates the current profile retrieving components when the memory is in a writing operation and FIG. 9 illustrates the current profile retrieving components when the memory is in a reading operation.

The current profile of the memory I/O ports may be retrieved by utilizing the simulation of the modeling utilizing the IBIS as illustrated in FIGS. 8 and 9. The memory I/O ports may receive the several control signals, the data signals, and address signals. However, to perform an accurate analysis, the representative control signal, one of the data signals, and an on address signal may be utilized during modeling. Thus, by including a differential clock, a differential data strobe signal (DQS), data (0), address (0), and a termination resistor, the electrical current information of the memory interface power supply may be obtained. Because each IBIS model may be routed on the PCB, the IBIS model may connect by retrieving the S-parameter of the corresponding network on the PCB. Further, in the reading mode and the writing mode of the memory, the buffers may be constituted by setting RX and TX, respectively, as illustrated in FIGS. 8 and 9. The input signals of each Clock may be a bit stream of an operating frequency with respect to a real integrated circuit (IC) timing.

By the above processing, the current profile may be generated in the time domain and the frequency domain. A generated Current Profile is illustrated at a left portion of FIG. 10.

Additionally, by inputting the clock, each signal may generate harmonic signals having a lower frequency naturally. For instance, if the DQ signals synchronized with one DQS and operating are 8 bits, the low frequency harmonics corresponding to the one eighth of the memory operating frequency may generate. Thus, assuming a worst case, if a frequency having a same size of standard signals exists, a corresponding frequency component of the electrical current may be added to the standard model to be compensated.

Figure 10:
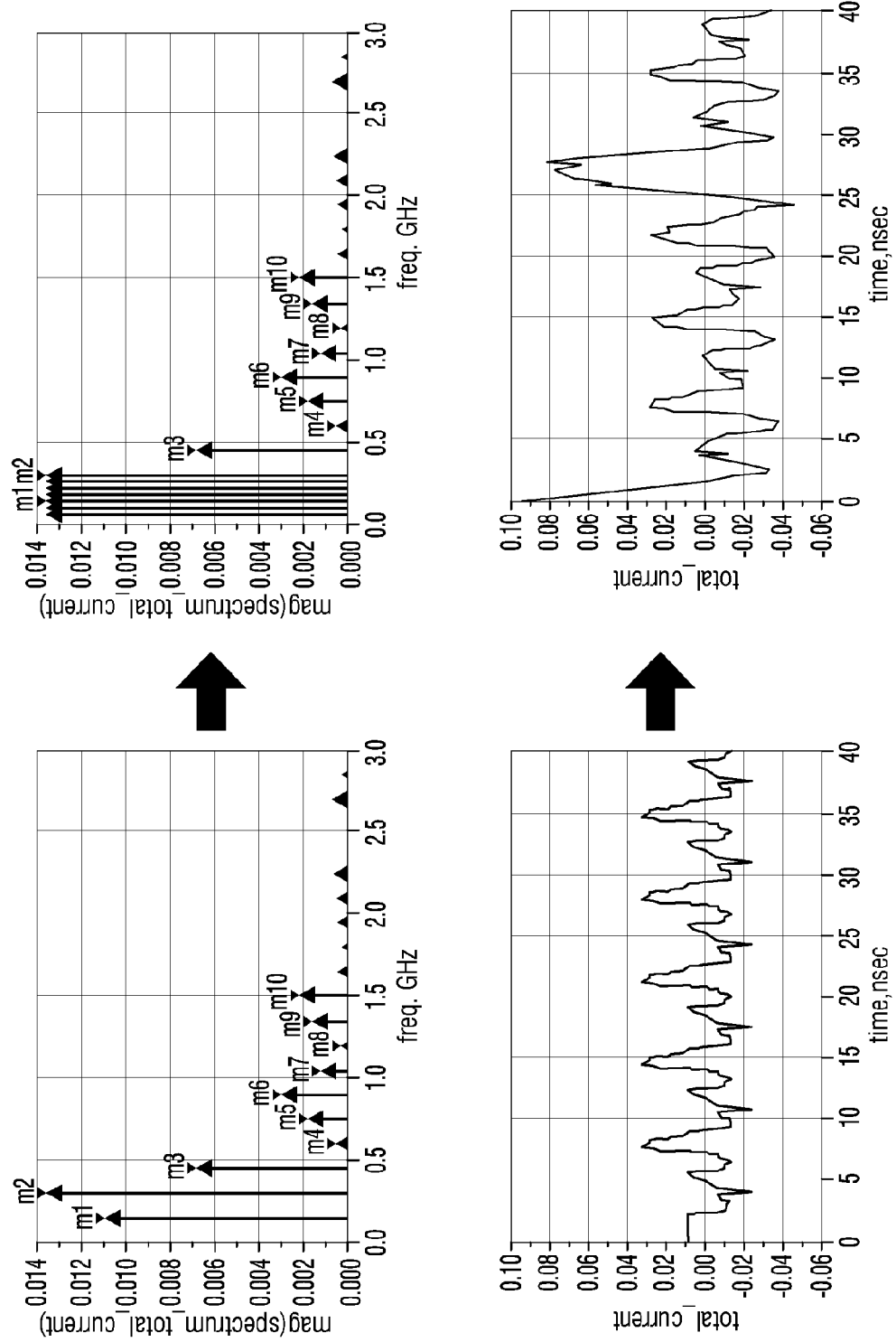
FIG. 10 illustrates waveform in the electrical current/frequency domains added with the lower frequency model.

Considering the above assumption, if the low frequency modeling is added, waveform of the current profile may change by referring to FIG. 10.

Thus, according to an exemplary embodiment of the present general inventive concept, the current profile considering the low frequency harmonics generated naturally may be provided.

FIG. 10 illustrates a waveform of the electrical current time/frequency domains added with the low frequency model. Specifically, the left portion of FIG. 10 is waveform of the electrical current time/frequency domains before being added with the low frequency model and a right portion of FIG. 10 is waveform of the electrical current time/frequency domains after being added with the low frequency model.

Referring to FIG. 10, if the low frequency model is added, the current profile in the frequency domain and the current profile in the time domain changes. According to an exemplary embodiment of the present general inventive concept, the current profile may be retrieved by considering the low frequency Harmonics. Thus, the power supply noise may be analyzed more precisely.

Figure 11:
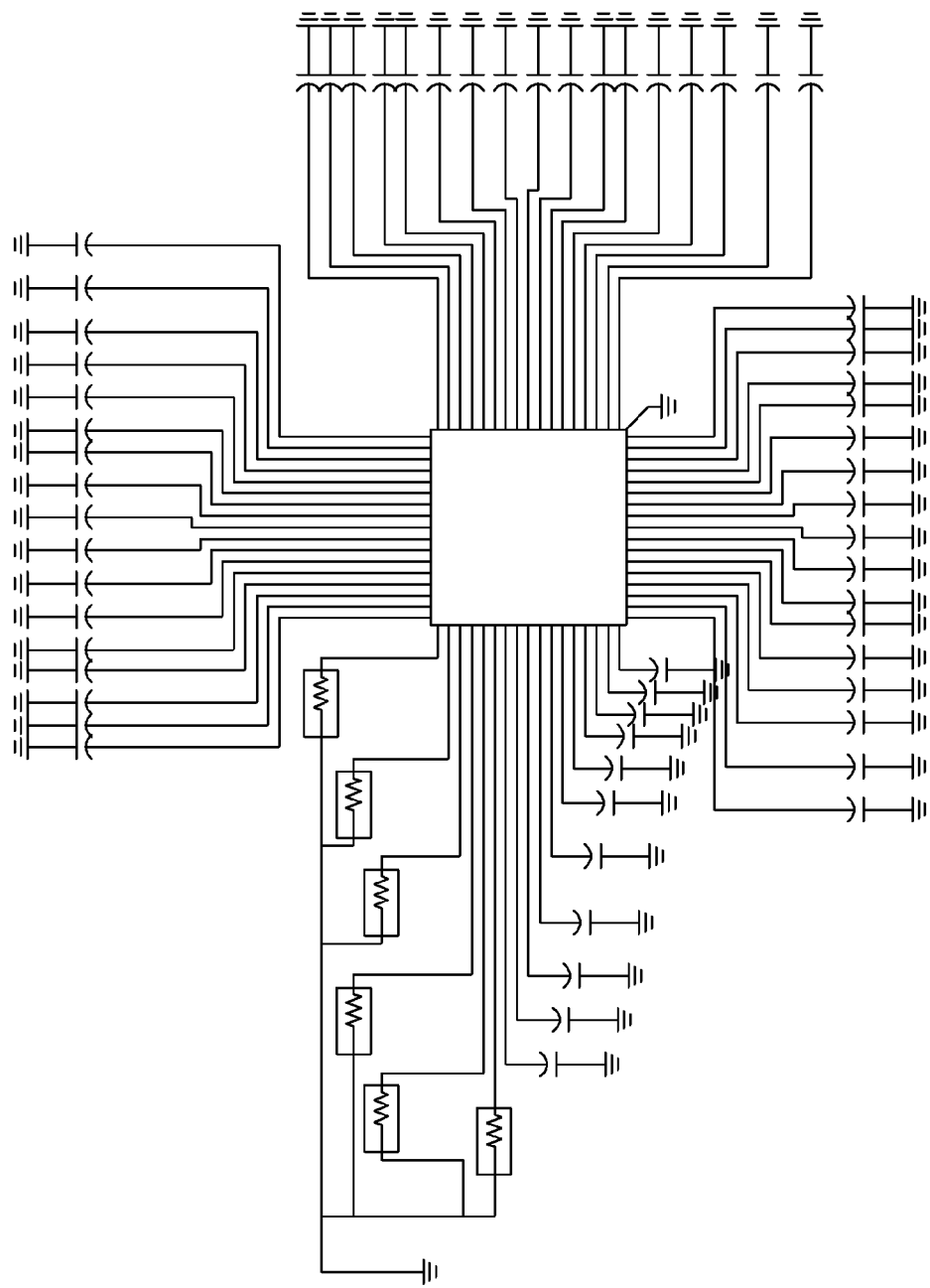
FIG. 11 illustrates a circuit simulation modeling integrating the PDN and the de-coupling capacitors.

FIG. 11 illustrates the circuit simulation modeling integrating the PDN and the de-coupling capacitors.

The S-parameter of the PDN regarding the memory I/O on the PCB may be retrieved by electromagnetic (EM) simulation. The ports of the S-parameter may be set on a position of a voltage regulator model (VRM), a controller IC Die ball, a DDR memory ball, and each de-coupling capacitor. The retrieved S-parameter may be called from the circuit simulator of FIG. 11 and may be integrated with the de-coupling capacitors model to complete the retrieving of the S-parameter in the PDN. The de-coupling capacitors may connect to the ports to be set and may be deleted to adjust the number of the de-coupling capacitors.

The current profile retrieved in FIG. 10, the S-parameter retrieved in FIG. 11, and the mathematical formula of FIG. 7 may be utilized to calculate the accumulated noise. Specifically, a appropriateness of the time constant and the number of the de-coupling capacitors may be compared by multiplying the electrical current information provided from the IBIS modeling by the impedance to find the absolute value and calculating the accumulation sum per frequency.

Additionally, because the total control signals, the data signals and the address signals are not considered in the IBIS modeling, the values by multiplying the electrical current and the impedance may not be the absolute standard. However, calculating the accumulation sum by accumulating the values per frequency considering the noise components to the applicable frequency may be the relative standard to perform the determination. The calculation of the accumulation sum is depicted with respect to FIG. 12.

Although only a portion of the control signals in the IBIS modeling is described here for convenience and for testing purposes, the total control signals, the data signals and the address signals may be all utilized to perform the IBIS modeling.

Figure 12:
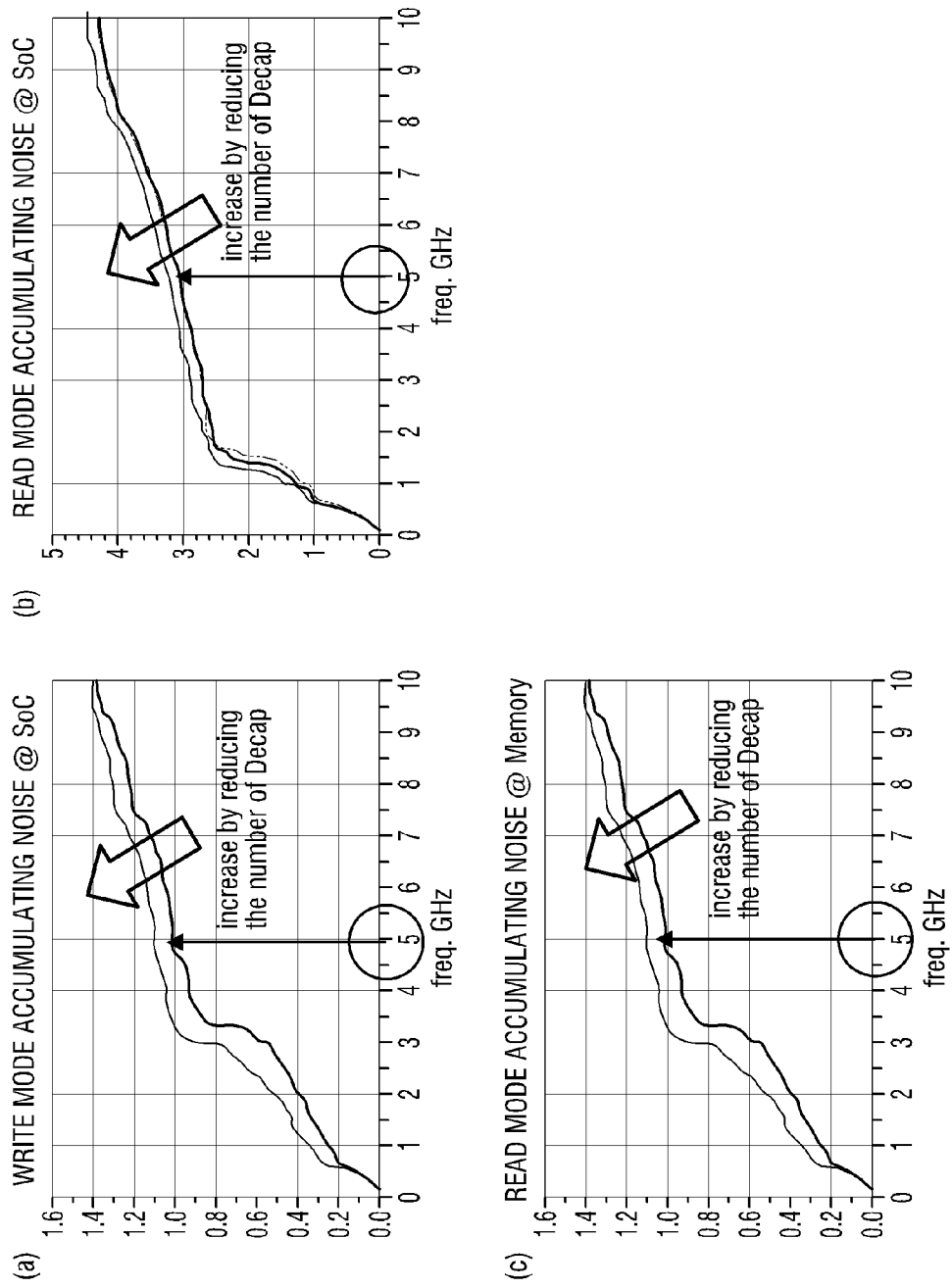
FIG. 12 illustrates an example of accumulated noises.

FIG. 12 illustrates the accumulated noises.

By referring to FIG. 12, the accumulation sum of the noise in the modes of writing/reading by the memory is described. Specifically, in the mode of writing by the memory, the data and the clock may be directed from the processor to the memory. Thus, the noise may be generated from the processor as illustrated in (a). In the mode of reading by the memory, the data, the clock, and the address may transmit and receive to each other, the noises may be found in the memory and the processor as illustrated in (b) and (c), respectively.

Furthermore, the time constant and the number of the de-coupling capacitors may change, and the accumulation sum of the various noises may increase by reducing the number of the de-coupling capacitors by referring to FIG. 12. Thus, the noise accumulation sum per number of the plurality of de-coupling capacitors may be calculated. The time constant and the number of the de-coupling capacitors to reach the accumulated noise values that is less than 10% of the standard accumulated noise values may be determined. The standard accumulated noise level may be the accumulated noises such that the greatest number of the de-coupling capacitors may be arranged on the PCB.

The frequency that can be considered as the standard may be about 5 GHz. The frequency bandwidth, where the de-coupling capacitors arranged on the PCB may influence the impedance, may be less than about 1 GHz, the component in the IC package may be several GHz of the bandwidths, and the accumulation sum of the noises may change linearly after the several bandwidths. Comparing the accumulation sum until the 5 GHz mark is reached may be efficient.

Figure 13:
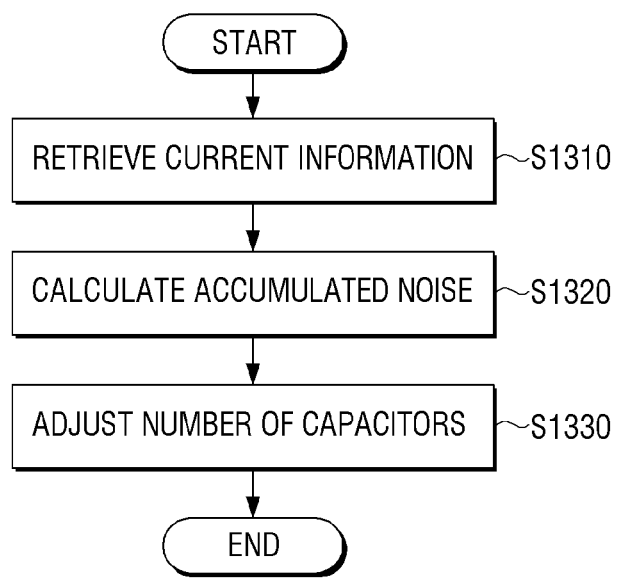
FIG. 13 is a flowchart provided to explain a method of optimizing the de-coupling capacitors according to an exemplary embodiment of the present general inventive concept.

FIG. 13 is a flowchart provided to explain a method of optimizing the de-coupling capacitors according to an exemplary embodiment of the present general inventive concept.

The current profile and the S-parameter regarding the I/O ports of the selected a plurality of circuit devices may be retrieved at S1310. The detailed electrical current information retrieving method is described above by referring to FIGS. 8 through 10. The method of retrieving the S-parameter is described above by referring to FIG. 11.

Based on the retrieved S-parameter, the impedance per number of the de-coupling capacitors may be calculated, and the accumulated noise values per number of the de-coupling capacitors based on the calculated impedance and the retrieved electrical current information at S1320. Specifically, based on the calculated impedance and the electrical current information, the noise values per frequency bandwidth may be calculated, and the accumulated noise values may be calculated by accumulating the calculated noise values per frequency bandwidth.

Based on the accumulated noise values, the number of the de-coupling capacitors may be determined at S1330. Specifically, the least number of the de-coupling capacitors among the calculated accumulated noise values which does not exceed 10% of the standard accumulated noise value. The "10% of the standard accumulated noise value" is one value in an exemplary embodiment of the present general inventive concept, and is not limited to herein.

Figure 14:
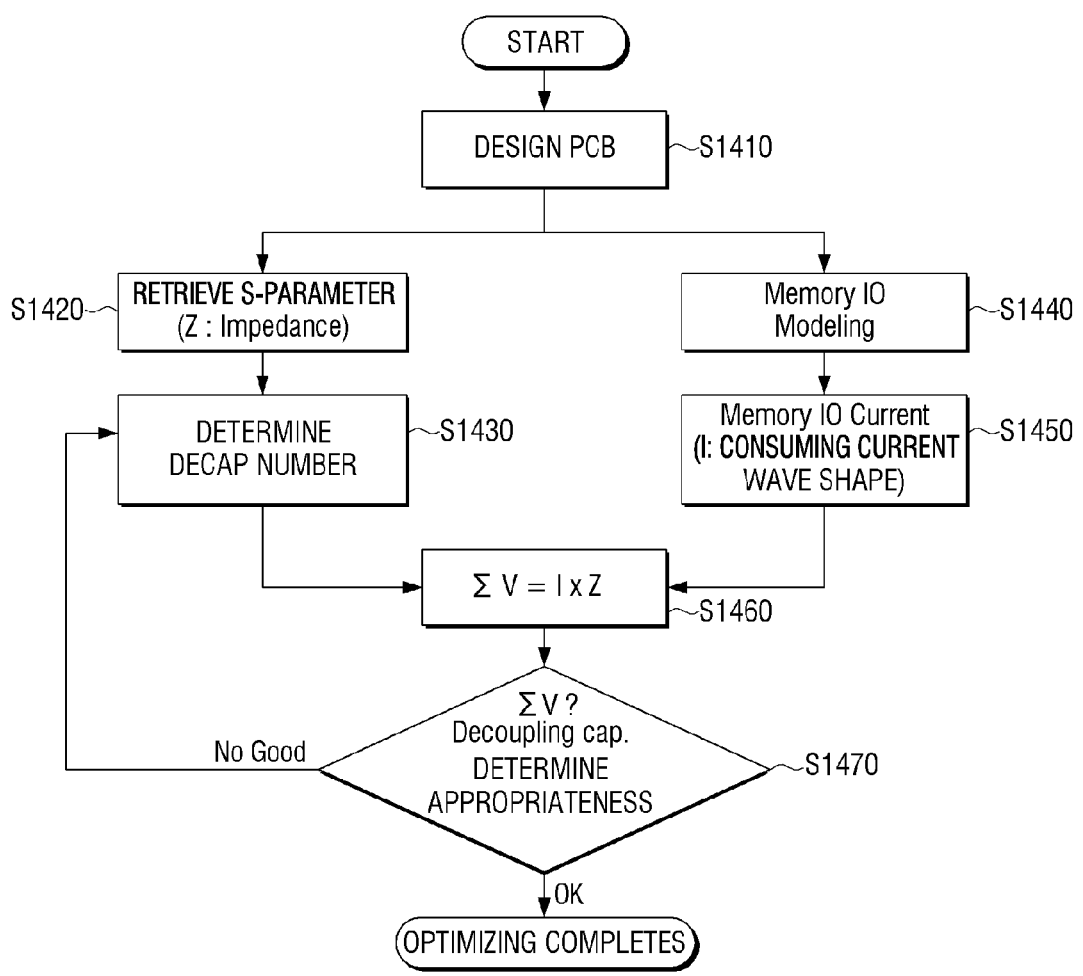
FIG. 14 is a flowchart provided to further explain the optimizing method of FIG. 13.
Figure 15:
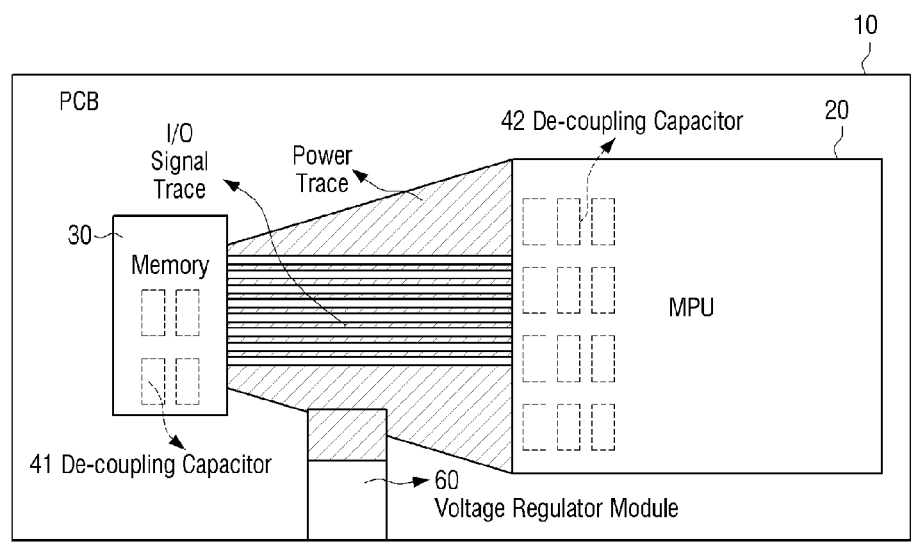
FIGS. 15 and 16 illustrate conventional circuit boards.
Figure 16:
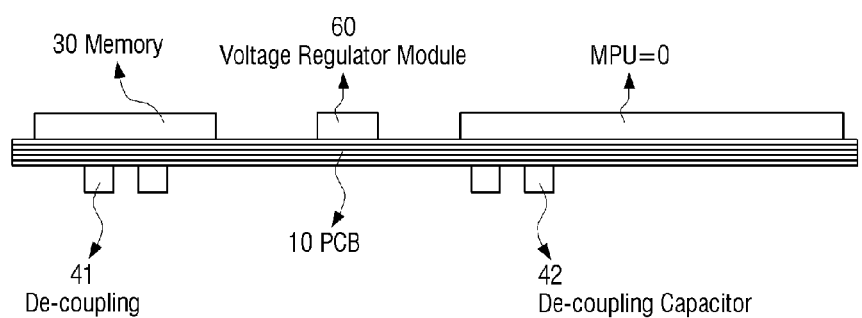

FIG. 14 is a flowchart further describing the optimizing method of FIG. 13.

Referring to FIG. 14, the PCB may be arranged at S1410. Specifically, the PCB may be arranged as illustrated in FIG. 2.

The S-parameter may be retrieved on the designed PCB at S1420. Specifically, the retrieved S-parameter may be called from the circuit simulator of FIG. 11, and integrated with the de-coupling capacitor model to complete the retrieving of the S-parameter from the PDN.

The number of the de-coupling capacitors ("DECAP") to be applied may be determined at S1430. Specifically, the number of the de-coupling capacitors may be adjusted by connecting the de-coupling capacitors to the ports to be set or by deleting the de-coupling capacitors.

The I/O ports of the memory may be modeled at S1440, and the electrical current information of the memory I/O ports may be retrieved at S1450. The retrieving operation is described above by referring to FIGS. 8 and 9.

The accumulated noise values may be calculated by utilizing the retrieved impedance information and the electrical current information at S1460. Specifically, by utilizing the current profile retrieved in FIG. 10, the S-parameter retrieved in FIG. 11, and the mathematical formula in FIG. 7, the accumulated noise values may be calculated.

The calculated accumulated noise values may be compared to determine whether they exceed 10% of the standard accumulated noise values at S1470. If the calculated accumulated noise values exceed 10% of the standard accumulated noise values, the number of the de-coupling capacitors may be adjusted again and the following process may repeat.

The methods as described by the above exemplary embodiments may utilize electrical current information retrieved with IBIS modeling, analyze power supply noise, and determine a number of de-coupling capacitors within an electronic apparatus. Thus, the power supply noise may be predicted more precisely, and the number of the de-coupling capacitors may be determined more efficiently. The optimizing method of FIGS. 13 and 14 may be implemented in the electronic apparatus having the components of FIG. 6 as well as the electronic apparatus having other components than those as illustrated in FIG. 6.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   a circuit board;
   a processor disposed on an upper surface of the circuit board;
   a memory disposed on a lower surface of the circuit board, wherein the lower surface of the circuit board on which the processor is arranged overlaps an area corresponding to where the memory is disposed;
   a de-coupling capacitor commonly connected to a power supply of the processor and a power supply of the memory; and
   a first switch arranged between the power supply of the processor and the de-coupling capacitor.

2. The electronic apparatus of claim 1, wherein the processor comprises a plurality of first terminals to transmit and receive signals to and from the memory,
   the memory comprises a plurality of second terminals to transmit and receive signals to and from the processor, and at least one of the plurality of first terminals connects to at least one of the plurality of second terminals through a via hole of the circuit board.

3. The electronic apparatus of claim 2, wherein the plurality of first terminals are arranged on an upper surface of the circuit board, and the plurality of second terminals are arranged on a lower surface of the circuit board to correspond to the plurality of first terminals.

4. The electronic apparatus of claim 2, wherein the signals transmitted and received through the plurality of first terminals and the plurality of second terminals comprise at least one of a data signal, a control signal and a clock signal.

5. The electronic apparatus of claim 1, further comprising:

a second switch arranged between the power supply of the processor and the de-coupling capacitors, wherein the controller shunts the first switch and opens the second switch during a memory writing operation, and the controller opens the first switch and shunts the second switch during a memory reading operation.

6. The electronic apparatus of claim 5, wherein the processor transmits a chip select signal to the memory, the first switch shunts if the chip select signal is on and opens if the chip select signal is off, and the second switch opens if the chip select signal is on and shunts if the chip select signal is off.

7. The electronic apparatus of claim 1, wherein the de-coupling capacitor comprises a plurality of de-coupling capacitors connected in parallel.

\* \* \* \* \*